Inventor
John J. Toth
By Johnson and Kline
Attorneys

Patented June 15, 1954

2,680,973

UNITED STATES PATENT OFFICE 2,680,973

STRUCTURAL MEMBER FOR WORK SUPPORTS AND THE LIKE

John J. Toth, Bridgeport, Conn.; Minnie L. Toth, administratrix of said John J. Toth, deceased Application January 4, 1952, Serial No. 265,031

8 Claims. (Cl. 77—62)

The present invention relates to stock material for structural purposes and especially to integral structural members to be used in the manufacture of work supports, such as jigs and fixtures. More particularly the present invention is concerned with integral structural members to be used in the manufacture of box and open-side jigs.

Whenever a piece of work is to have drilling, reaming, tapping, counterboring, or similar operations, performed on it, it is usually necessary that the work be held fixed and that the tool be guided thereinto by jigs or fixtures. This is especially so when such operations are to be located at different places on the workpiece and/or at various angles thereto, when there is a greater tendency for the workpiece to shift or move.

One of the most common forms of a jig in popular use is the cast jig which can be made sufficiently accurate and can normally be easily handled for rapid operation and high production output. However, such jigs are fairly expensive inasmuch as a carefully made pattern is required in its molding or casting, in addition to the usual labor and materials costs. Furthermore, such jigs cannot be made very quickly due to the time required in the making of the pattern and in the machining and finishing of the cast jig. This is especially so when a considerable amount of the machining and finishing is required to be done inside the jig or within cavities or openings therein which are far more difficult operations than a mere finishing of an external flat surface. As a consequence, this renders cast jigs undesirable where economy is an important factor or where the jig is needed fairly quickly.

Welded jigs are often preferred because they can be made more quickly and since they are lower in cost than cast jigs. Additionally, they lend themselves more adaptably to later changes in design whereas the cast jig is not as adaptable. However, welded jigs have been found to be less sturdy and less accurate and are more apt to warp and twist and therefore are not desirable where precision work is required and close tolerances and allowances are involved.

Built-up jigs are another form of work support and are normally constructed from their separately formed component parts which are securely bolted or screwed together. Such jigs have very wide adaptability and have been used in the industry, such as for example, when working on relatively small parts. These built-up jigs are especially of use where speed is important and it is necessary to complete a particular job within a prescribed time or before a specified deadline. In such a case, the delay caused by waiting for a pattern to be constructed and then for molds and castings to be made and finally the machining or finishing thereof could not be tolerated. This type of work support has also found great applicability wherever a complete engineering department is not available or wherever the design and construction of the jig could be worked out more profitably on a piecemeal basis by a tool maker.

On the average, the normal cost of making a built-up jig would be about the same as a cast jig, or perhaps only slightly less, and thus such jigs have not been resorted to except as mentioned in the special cases above. One of the main difficulties lies in the fact that there normally is a very low availability of materials suitable for constructing the jig. Rolled sheets tend to warp and twist when their surfaces are machined and hence require continual checking and correction, change in size, rematching of pieces, etc., and therefore are unsuitable for the purpose. Normalized cast plates are not ordinarily available for such uses. As a consequence, built-up jigs have not reached as extensive a use as would be predicted from their advantages.

Box jigs fit within this category and normally are in the form of a box provided with accurately machined bearing surfaces or feet to rest, for example, on the bed of a drill press or other machine tool. These jigs are usually quite heavy and are held in position by their own weight, thus saving the time of the operator which would be consumed in aligning the tool with the work and in clamping. A hinged lid or rotatable cam bar or the like may be provided to allow for insertion and removal of the work from the box and a simple quick action locking lever or eye-bolt and knurled-nut may be used to lock the lid or workpiece in place. Thumb screws passing through the lid or sides of the box, or any other suitable clamping device, may be used to hold the work securely when the lid is closed, so that the work will not move or shift when subjected to the drilling, reaming, tapping or counterboring or other operations performed by the machine tool.

Although the box jig is often the only way in which a particular job can be done, there usually is considerable work involved in the preparation of the several component parts of the jig and since they must be carefully and individually made, such jigs are not inexpensive and often require considerable time for their manufacture. Additionally, whenever such a box jig is required, it usually must be built up completely from raw stock material of general utility and applicability whereby considerable time and money are expended.

It is a purpose of the present invention to provide structural stock material or a "stock rail" for a jig whereby it may be made relatively inexpensively and quickly but nevertheless may be made sufficiently accurate to hold the work to a higher degree of precision than normally possible in the average machine shop.

It is a further purpose of the present invention to provide structural stock material for a jig which may be easily assembled or disassembled without detracting from its sturdiness or rigidity.

It is a still further purpose of the present invention to provide structural stock material having great adaptability for making jigs of different sizes or shapes and suited for various purposes and uses, and wherein the various parts may be reclaimed and used for making additional work supports.

Another purpose of the present invention is to provide a jig which is adaptable for use with a great variety of workpieces of different sizes and shapes.

In the accompanying drawing and the following specification, I have illustrated and described a preferred design of structural member embodying my invention and a form of a box jig built thereof but it is to be understood that my inventive concept is not to be considered as limited to the specific constructions disclosed except as determined by the scope of the appended claims.

With reference to the accompanying drawing.

Figures 1, 2, 3, 4:
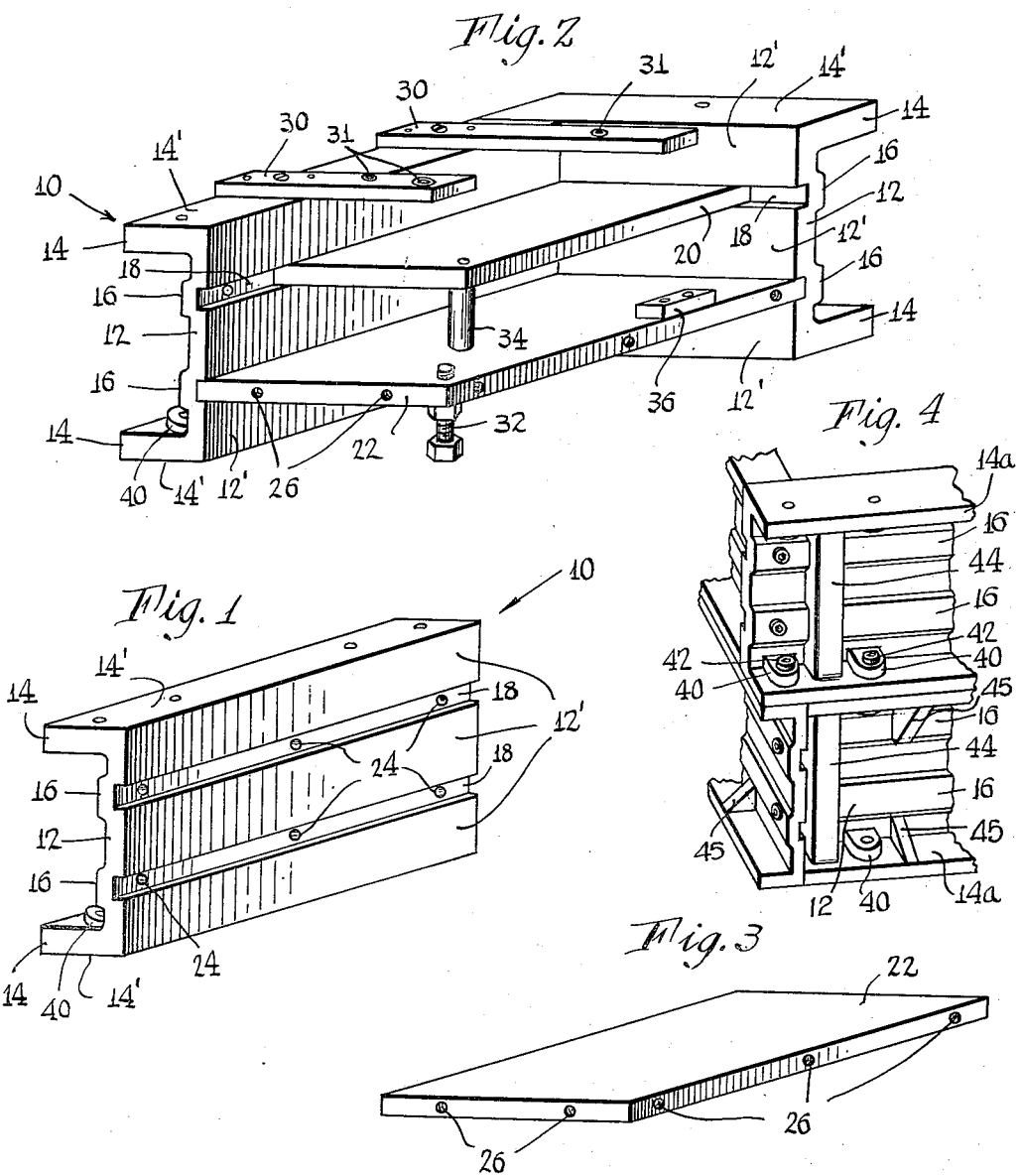
Figure 1 is a perspective view of the structural member of the present invention.
Fig. 2 is a perspective view of a jig constructed from the structural members of the present invention.
Fig. 3 is a perspective view of a plate used in conjunction with the structural members to form the box jig.
Fig. 4 is a perspective view showing the use of the structural member or stock rail in building a deep box jig.

In the embodiment of the invention shown in the drawing, the structural member or beam 10 possesses a U-shaped rail or channel configuration and is preferably made of normalized cast iron or cast steel. The rail or channel comprises a body portion 12 and two flanges 14, 14 extending outwardly therefrom at its lateral edges. The outer or side surface 12' of the body 12 as well as the top and bottom surfaces 14', 14' of the flanges 14, 14 are carefully machined and finished so that the top and bottom surfaces 14', 14' are perpendicular to the side surface 12' and, of course, parallel to each other. The structural members may be made of any length, as desired, and reinforcing ribs 16 may be formed integrally therewith at spaced positions along the inner surfaces of the channel to strengthen the body 12 and flanges 14, 14 against deflection and/or distortion. If desired, these ribs may extend vertically as well as horizontally whereby a substantial savings in material is obtained, without any great sacrifice in strength or rigidity.

Grooves 18 are formed in the machined surface 12' of the body 12 and extend longitudinally along the length thereof parallel to the machined surfaces 14', 14' of the flanges 14, 14. The grooves may be rectangular and the width and depth thereof may be varied within wide ranges. It is merely necessary that the width and depth be such that the rectangular edge of a sheet or plate of cold rolled steel 22 of a standard gauge have a press fit therein. Inasmuch as cold rolled steel is normally held to extremely close tolerances during its commercial manufacture, although still remaining relatively quite inexpensive, it is to be appreciated that the widths of the grooves 18 should be held to similarly close tolerances so as to prevent any play or looseness in the sheet or plate when positioned therein. The plate 22 should be of sufficient thickness that it resists deflection or bending when supported in the grooves 18.

The jigs may be made in several sizes and it it to be appreciated that the larger the jig is, the heavier will be the standard size of cold rolled steel plate selected as well as a greater width of slot in the rail member 10. Therefore, the rails used may be supplied in various sizes with the slots being proportionately wider in the larger rails.

The structural members 10 may be cast in any desired length, such as up to 8 feet, for example, or longer, if desired, and may be finished as described above and sold to the trade or industry in such lengths or any shorter lengths, as required according to the circumstances of the particular case.

When a tool maker wishes to make a box or open-side jig, he selects a structural member and cuts it to the proper lengths as needed to form the sides of the box. It is to be realized that it is not necessary that the box have four sides but that two or three-sided boxes are equally practicable.

A two-sided box has been shown in Fig. 2 but it is to be realized that such is merely illustrative of the principles involved in the inventive concept and that such is not to be construed as limitative thereof.

The cold rolled steel plate 22 of the proper thickness is then selected and is cut to the appropriate length and width and fitted within the grooves 18, as shown in Fig. 2. The plate 22 should have a snug fit within the grooves 18 of the two structural members which have previously been arranged in edge to edge angular relationship to form the two-sided box.

In order to secure the plate 22 firmly and rigidly in position so that it will remain in proper relationship to the other parts of the jig at all times, openings 24 are formed in the grooves 18 of the body and tapped openings 26 are formed in aligned corresponding positions in the sides of the plates, as shown in Figs. 1 and 3. Screws or bolts are then passed through the openings 24 and are threaded into the tapped openings 26 to draw the complete jig together into a sturdy and well braced construction. If desired or necessary, a plate 20 may be cut to a different size than the plate 22 and may be inserted in the upper groove 18 and secured in position in the same fashion as plate 22 to thus form a shelf-like surface parallel to the plate 22.

Although the surface 12' of the structural member may have as many grooves or slots 18 as desired, up to five or more, for example, with as many plates as required, the preferred embodiment of the invention has been illustrated with merely two such grooves and two plates. These grooves may be spaced apart in any selected constant or varying relationship and in the preferred embodiment are spaced so as to afford a one-inch step between the adjacent parallel surfaces.

The top surface 14' of the structural member is perpendicular to the side surface 12' and parallel to the bottom surface 14' and forms a supporting surface for bushing plates 30 which may be secured in position thereon by bolts or by any other suitable fastening means. These bushing plates 30 form the supporting means for the hardened steel bushings 31 which guide the drill, or reamer, or other tool, into the work. If it is desired to use a hinged cover construction or a similar device as is commonly employed for box jigs, this surface 14' forms an excellent base or support therefor.

The presence of several grooves and the use of several shelves of various widths make the work support extremely adaptable for various shapes and sizes of work and it is always possible therefore to mount the work close to the bushing plate or to the hinged cover whereby the tool will be guided very accurately through the steel bushing and into the work immediately without requiring it to move a considerable distance between the guide and the work whereby errors could be introduced.

Whenever a two-sided box jig is made, an adjustable supporting leg 32 having machined and finished bottom surfaces may be positioned at the unsupported corner of the plate 22 whereby a firmer construction is obtained. In a similar fashion, a supporting leg 34 may be positioned at the unsupported corner of the plate 20 to support the same and form a firm unyielding shelf. Although the surfaces 14' have been described as machined and finished to furnish suitable bearing surfaces, such may be dispensed with in the interests of economy and suitable legs or feet, similar to legs 32, may be formed in the lower flange 14 to supply the required bearing surfaces to rest on the bed or table of the machine tool.

The use of the box jig will be apparent to any person skilled in the art. The workpiece (not shown) may be positioned on the plate 22 and/or on the plate or shelf 20 by means of location points or inserts. These may take the form of adjustable studs threaded and locked in position, or screw jacks, or adjustable parallel blocks, or any other mounting devices well known and used in the art, especially in the setting up of irregular workpieces. A location block 36 is shown in Fig. 2 as illustrative of such locating and setting up devices but it is to be appreciated that other devices may be similarly used.

The box jig is thus readily adaptable for different sizes and shapes of workpieces. The grooves in the side walls permit the use of several shelves whereby portions of workpieces of extremely irregular shape may be located to rest on the several plates inserted in the grooves. The rapidity with which the basic box jig may be formed is to be noted especially inasmuch as no special tooling up is required. A considerable saving in time and money is thus effected without any sacrifice in accuracy or sturdiness of construction.

It is to be appreciated that, after the workpiece has been securely locked in position, the box jig may be reversed and the required operations performed on the workpiece from the opposite direction. If desired, hardened steel bushings may be provided in the cold rolled steel plates 20, 22 to guide the tools when working with the jig in the reversed position, thereby obviating the necessity for the bushing plates 30.

In order that a box jig of greater depth than a single stock rail be manufactured, means are provided to enable the rails to be secured to each other in a vertical arrangement whereby twice or three times or greater depth may be obtained. One way of accomplishing this is shown in Fig. 4 wherein bosses 40 are formed on the bottom and top flanges 14a and are suitably drilled or internally threaded for the reception of any desired fastening means 42, such as nuts and bolts or cap screws or the like whereby the separate stock rails may be properly aligned and secured to each other. These bosses may be located at any predetermined position and with any desired spacing and, as shown in Fig. 4, have been located adjacent vertical ribs 44. In this way, the proper spacing is provided to permit the cutting of longitudinal and/or end plates of the box jig from a single rail.

The accuracy of the grinding or finish machining may be carried out to any desired degree of accuracy by any special methods or heat treatment or other manipulative processes involving highly specialized knowledge, skill, and equipment not ordinarily found in the average machine shop in the industry. In this way, stock rails of superior quality will be made readily available for use in average machine shops of the usual variety which have hitherto been limited in their operations by the lack of such highly specialized knowledge, skill and equipment.

After the box jig has served its purpose and is no longer of use, it may be disassembled and the various parts thereof retained so that they may be used again in the construction of other jigs. This creates factors of interchangeability and reclamation of parts which are highly advantageous and economical and which are not present in other types of jigs.

For the purpose of minimizing warping of the casting, gussets 45 are provided, Fig. 4, reinforcing the junction of the body 12 and the flanges 14a.

While I have shown and described what I believe to be a preferred embodiment of my invention in the matter of simplicity and durability of construction, ease of operation and use, etc., it will be obvious that the details of such construction may be more or less varied or modified within the scope of the appended claims without departure from the principles of construction or material sacrifice of the preferred design, and that portions of the improvements may be used without others.

I claim:

1. A structural member for use in the construction of work supports for mounting work on a bed of a machine tool, comprising a substantially rectangular body portion having a front machined surface lying substantially in a plane and side portions extending between its ends, said side portions having machined surfaces lying in parallel planes perpendicular to the plane containing the front machined surface of the body portion, said body portion having a pair of spaced grooves of rectangular cross section therein disposed in its machined surface and extending between the ends of the body portion substantially parallel to the machined surfaces of the side portions, and said body portion having identical sets of holes similarly symmetrically positioned in said grooves to receive fastening screws for holding shelf members, and having ribs extending along and disposed in back of the grooves to strengthen the body portion and maintain a substantially uniform wall thickness.

2. The invention as defined in claim 1 in which the side portions of the structural member have flanges at the back of the body portion to give the structural member a channel shape, said flanges having the machined surfaces of the side portions.

3. The invention as defined in claim 2 in which there are gussets reinforcing the junctions of the body portion and the flanges.

4. A work support for mounting work on a bed of a machine tool, comprising a plurality of separate structural members, each member having a substantially rectangular body portion with a front machined surface lying substantially in a plane and side portions extending between its ends, said side portions having machined surfaces lying in parallel planes perpendicular to the plane containing the front machined surface of the body portion, said body portion having spaced grooves of rectangular cross section therein disposed in its machined surface and extending between the ends of the body portion substantially parallel to the machined surfaces of the side portions, each structural member being releasably secured and positioned at right angles to an adjacent structural member with the grooves in each body portion running into grooves of an adjacent body portion and forming a continuous nonlinear groove therewith; and a shelf plate extending into said nonlinear grooves and lying in a plane substantially parallel to the planes containing the machined surfaces of the side portions.

5. A work support for mounting work on the bed of a machine tool comprising a plurality of separate structural members, each member having a substantially rectangular body portion with a front machined surface lying substantially in a vertical plane and top and bottom backwardly projecting flange portions having machined surfaces lying in parallel horizontal planes perpendicular to the plane containing the front machined surface of the body portion, said body portion having a plurality of spaced grooves therein disposed in its machined surface and extending between the ends of the body portion substantially parallel to the machined surfaces of the top and bottom flange portions, each structural member being releasably secured and positioned at right angles to an adjacent structural member with the grooves of each body portion running into the grooves of an adjacent body portion and forming continuous nonlinear grooves therewith; and a plurality of shelf plates extending into said nonlinear grooves and lying in planes substantially parallel to the planes containing the machined surfaces of the top and bottom flange portions.

6. A work support for mounting work on a bed of a machine tool comprising a plurality of separate structural members, each member having a substantially rectangular body portion with a front machined surface lying substantially in a vertical plane and top and bottom backwardly projecting flange portions having machined surfaces lying in parallel horizontal planes perpendicular to the plane containing the front machined surface of the body portion, said body portion having a plurality of spaced grooves therein disposed in its machined surface and extending between the ends of the body portion substantially parallel to the machined surfaces of the top and bottom flange portions, each structural member being releasably secured and positioned at right angles to an adjacent structural member with the grooves of each body portion running into the grooves of an adjacent body portion and forming continuous nonlinear grooves therewith; a plurality of shelf plates extending into said nonlinear grooves and lying in planes substantially parallel to the planes containing the machined surfaces of the top and bottom flange portions; and a plurality of vertical reinforcing ribs located on the rear sides of the body portion for strengthening said body portions thereat.

7. A work support for mounting work on a bed of a machine tool, comprising a horizontally extending rectangular shelf plate having squared edges, for supporting the workpiece; vertically extending structural members in contact with and secured to the squared edges of said plate to define therewith an open-sided rectangular box, said structural members having machined inner surfaces lying substantially in vertical planes and at right angles to each other, and having top and bottom machined surfaces lying substantially in horizontal planes; and guide means secured to and extending across the top machined surface of one of said structural members to direct a tool bit into the supported workpiece, with the bottom machined surfaces of the structural members resting on the bed of the machine tool, characterized by the fact that the structural members have grooves therein meeting each other and constituting one continuous nonlinear groove for receiving said plate and that said structural members and said plate are removably secured together to facilitate their disassembly.

8. A work support for mounting work on a bed of a machine tool, comprising a plurality of horizontally extending rectangular shelf plates having squared edges, for supporting the workpiece; vertically extending structural members in contact with and secured to the squared edges of said plates to define therewith an open-sided rectangular box, each of said structural members being positioned at a right angle to an adjacent structural member and said members having machined inner surfaces lying at right angles to each other and substantially in vertical planes and having top and bottom machined surfaces lying substantially in horizontal planes; and guide means secured to and extending across the top machined surface of one of said structural members to direct a tool bit into the supported workpiece, with the bottom machined surfaces of the structural members resting on the bed of the machine tool, characterized by the fact that the structural members have sets of grooves meeting each other and constituting a pair of continuous, nonlinear grooves for receiving said plurality of plates and that said structural members and said plates are removably secured together to facilitate their disassembly.

References Cited in the file of this patent

UNITED STATES PATENTS

| Number | Name | Date |
|---|---|---|
| 550,844 | Ring | Dec. 3, 1895 |
| 934,088 | Morton | Sept. 4, 1909 |
| 1,145,260 | Morton | July 6, 1915 |
| 1,268,458 | Hellgren | June 4, 1918 |
| 1,420,321 | Klausmeyer | June 20, 1922 |